(12) United States Patent
Kodavanji et al.

(10) Patent No.: US 12,450,130 B2
(45) Date of Patent: Oct. 21, 2025

(54) INCREMENTAL DATA BACKUP USING A COMBINED TRACKING DATA STRUCTURE

(71) Applicant: HEWLETT PACKARD ENTERPRISE DEVELOPMENT LP, Spring, TX (US)

(72) Inventors: Mashood Abdulla Kodavanji, Karnataka (IN); Clarete Riana Crasta, Karnataka (IN); Gautham Bhat Kumbla, Karnataka (IN); Syed Ismail Faizan Barmawer, Karnataka (IN); Sharad Singhal, Belmont, CA (US); Chinmay Ghosh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 166 days.

(21) Appl. No.: 18/448,690

(22) Filed: Aug. 11, 2023

(65) Prior Publication Data
US 2025/0053482 A1    Feb. 13, 2025

(51) Int. Cl.
G06F 11/14    (2006.01)

(52) U.S. Cl.
CPC ...... *G06F 11/1466* (2013.01); *G06F 11/1451* (2013.01); *G06F 11/1464* (2013.01)

(58) Field of Classification Search
CPC ............. G06F 11/1466; G06F 11/1451; G06F 11/1464
See application file for complete search history.

(56) References Cited

U.S. PATENT DOCUMENTS

| | | |
|---|---|---|
| 5,157,765 A | 10/1992 | Birk et al. |
| 5,375,235 A | 12/1994 | Berry et al. |
| 5,563,987 A | 10/1996 | Scott |
| 5,594,860 A | 1/1997 | Gauthier |
| 7,197,516 B1 | 3/2007 | Hipp et al. |
| 7,420,699 B2 | 9/2008 | Farrell et al. |
| 7,885,923 B1 * | 2/2011 | Tawri .................. G06F 11/2074 707/610 |
| 8,095,723 B2 | 1/2012 | Kim et al. |

(Continued)

FOREIGN PATENT DOCUMENTS

| | | |
|---|---|---|
| CA | 2028701 A1 | 5/1991 |
| CN | 101027649 A | 8/2007 |

(Continued)

OTHER PUBLICATIONS

"OpenFAM Reference Implementation", A library for programming Fabric-Attached Memory, Aug. 30, 2021, 2 pages.

(Continued)

*Primary Examiner* — Kalpit Parikh
(74) *Attorney, Agent, or Firm* — Trop, Pruner & Hu, P.C.

(57) ABSTRACT

In some examples, a system combines modified data tracking structures in a plurality of computer nodes into a combined tracking data structure, where a modified data tracking structure includes indicators of modified data portions in a network-attached memory. The system stores the combined tracking data structure at the network-attached memory. As part of an incremental data backup operation, (Continued)

the system uses the combined tracking data structure to provide the modified data portions from the network-attached memory to a backup storage system.

20 Claims, 5 Drawing Sheets

(56) References Cited

U.S. PATENT DOCUMENTS

| | | | |
|---|---|---|---|
| 8,631,203 | B2 | 1/2014 | Fortin et al. |
| 9,998,537 | B1* | 6/2018 | O'Connell .......... G06F 11/1464 |
| 10,353,780 | B1 | 7/2019 | O'Connell et al. |
| 10,761,941 | B1 | 9/2020 | Redko et al. |
| 10,929,238 | B2 | 2/2021 | Horowitz et al. |
| 12,287,734 | B2 | 4/2025 | Barmawer et al. |
| 2005/0108292 | A1* | 5/2005 | Burton .................. G06F 3/0689 |
| 2010/0169594 | A1 | 7/2010 | Tsaur et al. |
| 2014/0324782 | A1* | 10/2014 | Graefe ................ G06F 11/1471 707/646 |
| 2015/0113019 | A1 | 4/2015 | Jiang et al. |
| 2018/0039434 | A1 | 2/2018 | Balcha |
| 2019/0324868 | A1 | 10/2019 | Shivanna et al. |
| 2020/0104202 | A1* | 4/2020 | Stupak .................. G06F 16/119 |
| 2020/0293408 | A1 | 9/2020 | Mutha et al. |
| 2021/0271558 | A1 | 9/2021 | Kumarasamy et al. |
| 2021/0271563 | A1 | 9/2021 | Appireddygari et al. |
| 2022/0404984 | A1 | 12/2022 | Dornemann et al. |

FOREIGN PATENT DOCUMENTS

| | | |
|---|---|---|
| CN | 102388369 A | 3/2012 |
| CN | 102999400 A | 3/2013 |
| CN | 103713972 A0 | 4/2014 |
| EP | 0432896 A2 | 6/1991 |

OTHER PUBLICATIONS

CXL Compute Express Link: The Breakthrough CPU-to-Device Interconnect, Retrieved Aug. 4, 2022, 2 Pgs.

Hewlett Packard Enterprise, OpenFAM Reference Implementation, Introduction, May 30, 2023 (4 pages).

Hewlett Packard Enterprise, OpenFAM Reference Implementation, openfam::fam::fam_map, downloaded Jul. 10, 2023 (3 pages).

Morgan, Timothy Prickett, The Next Platform, The Future of System Memory is Mostly CXL, Jul. 5, 2022 (15 pages).

Pfister, "An Introduction to the InfiniBand™ Architecture", Chapter 42, IBM Enterprise Server Group, Aug. 4, 2022, pp. 617-632.

Sensi et al., "An In-Depth Analysis of the Slingshot Interconnect", Aug. 20, 2020, 13 pages.

Smith, Ryan, CXL Compute Express Link, Compute Express Link (CXL) 3.0 Announced: Doubled Speeds and Flexible Fabrics, Aug. 2, 2022 (8 pages).

Vasavada et al, "Comparing Different Approaches for Incremental Checkpointing: The Showdown", 2011, 4 Pgs.

Wikipedia, "Remote direct memory access", available online at <https://en.wikipedia.org/w/index.php?title=Remote_direct_memory_access&oldid=1093871583>, Jun. 19, 2022, 3 pages.

* cited by examiner

INCREMENTAL DATA BACKUP USING A COMBINED TRACKING DATA STRUCTURE

BACKGROUND

A network-attached memory refers to a memory that is accessible over a network by one or more computer nodes. A computer node issues, over the network, a request to access data from the network-attached memory. The network-attached memory includes memory devices, such as persistent memory devices and/or volatile memory devices.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computer nodes are able to perform remote access (remote read or remote write) of a network-attached memory. An example of a network over which computer nodes are able to access a network-attached memory includes a COMPUTE EXPRESS LINK (CXL) interconnect. In other examples, other types of interconnects can be employed to connect clients with a network-attached memory, such as a Slingshot interconnect, an InfiniBand interconnect, or any high throughput, low-latency interconnect.

Data backups can be performed from a network-attached memory. A data backup involves copying data of a memory region in the network-attached memory to a backup storage system. A backup storage system can include a collection of storage devices (a single storage device or multiple storage devices). A storage device can be implemented using a disk-based storage device, a solid-state drive, or any other type of storage device. If data at the network-attached memory were to be lost or exhibit unrecoverable errors, a restore operation can be performed from the backup storage system to recover the lost data or to restore the data to a prior version without errors.

In some examples, a full data backup can copy the entirety of the data of the network-attached memory to the backup storage system. However, if there is a large amount of data stored at the network-attached memory, then the full data backup can be expensive in terms of resource usage (e.g., usage of processing resources, usage of communication resources, etc.), and the full data backup can take a relatively long period of time to complete (e.g., many hours or days).

In other examples, incremental data backup can be performed, in which modified data portions are copied to the backup storage system, without copying unmodified data portions to the backup storage system. A data portion being "modified" refers to the data portion having been changed in the network-attached memory relative to a copy of the data portion stored at the backup storage system. An incremental data backup can reduce the backup time and usage of resources. Also, performing incremental data backups can reduce wear on hardware, such as storage media of the backup storage system, since the quantity of data written to the storage media can be reduced as compared to a full data backup.

Tracking data structures can be maintained in computer nodes to track modified data portions. Since a network-attached memory is shared across multiple computer nodes, modified data portions are tracked across the multiple computer nodes. An incremental data backup can be initiated at any of the computer nodes (the computer node that initiated the incremental data backup is referred to as an "initiating computer node"). The initiating computer node may have to obtain tracking data structures maintained in the other computer nodes to perform the incremental data backup. However, reading tracking data structures from the other computer nodes adds network traffic, which can result in reduced bandwidth over the network for read and write operations that read and write data of the network-attached memory. As a result, increased input/output I/O) latency may be experienced by computer nodes when accessing the network-attached memory.

Also, having to wait for the tracking data structures from the other computer nodes in combination with having to collate the tracking data structures at the initiating computer node before the incremental data backup can proceed can result in delays in completing the incremental data backup.

In accordance with some implementations of the present disclosure, a combined tracking data structure is provided based on combining modified data tracking structures in a plurality of computer nodes that track modified data portions in the network-attached memory. Modified data portions are data portions that have been modified in the network-attached memory relative to corresponding data portions in a backup storage system. The combined tracking data structure is stored in the network-attached memory, and the combined tracking data structure is accessible by any of the plurality of computer nodes to initiate an incremental data backup operation that backs up modified data portions from the network-attached memory to the backup storage system.

By maintaining the combined tracking data structure at the network-attached memory, any of the computer nodes can access the combined tracking data structure when the initiating computer node initiates an incremental data backup from the network-attached memory to the backup storage system. The initiating computer node does not have to collate multiple tracking data structures from multiple computer nodes, so that the incremental data backup can be started once the initiating computer node retrieves and processes the combined tracking data structure.

Figure 1A:
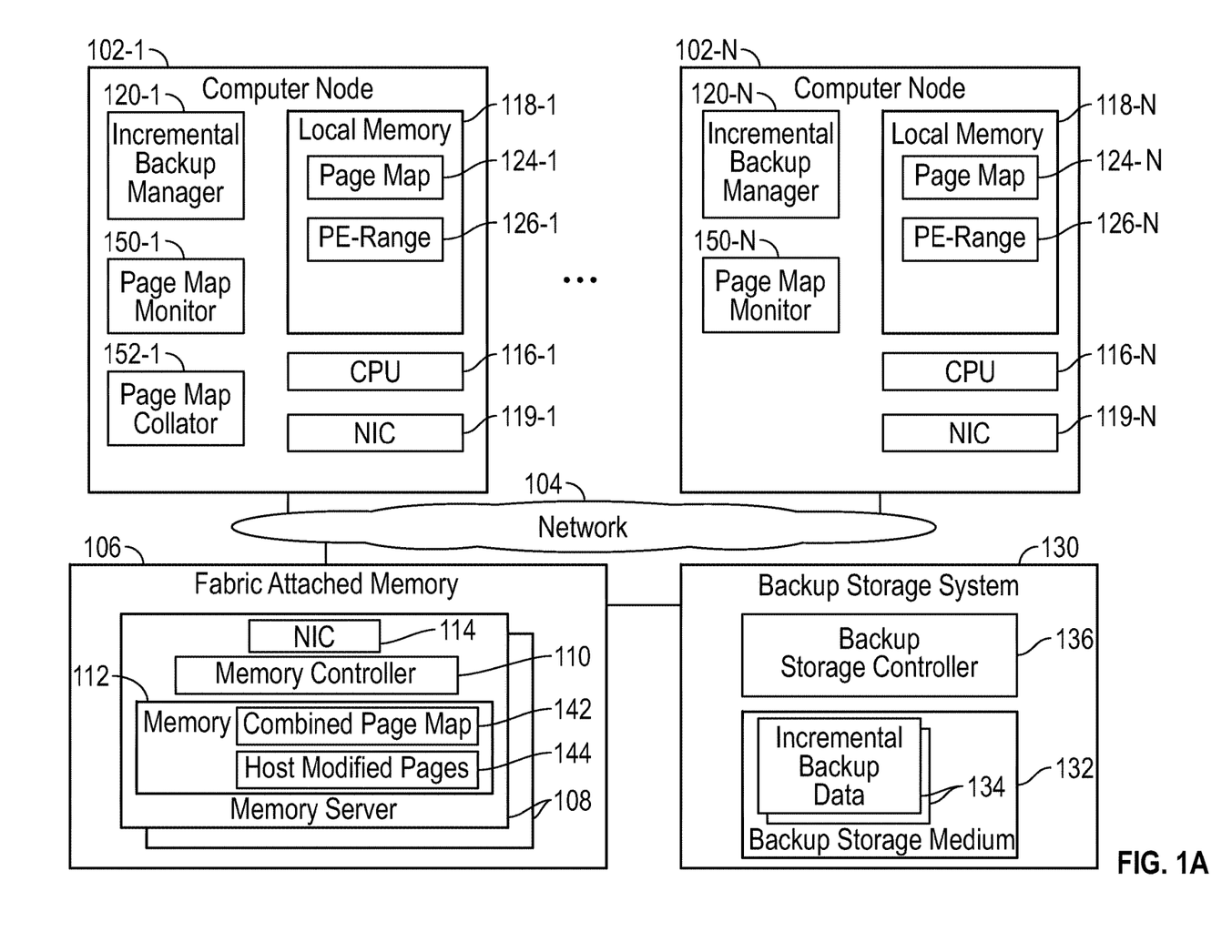
FIG. 1A is a block diagram of an arrangement that includes a fabric attached memory (FAM) including one or more memory servers coupled to a network, and computer nodes that are able to access the FAM over the network, and a backup storage system to which an incremental data backup can be performed, in accordance with some examples.

FIG. 1A is a block diagram of an example arrangement that includes multiple computer nodes 102-1 to 102-N (N≥2). A "computer node" can refer to a computer, a portion of a computer, or a collection of multiple computers. A computer can refer to any or some combination of: a desktop computer, a notebook computer, a tablet computer, a server computer, a smartphone, a game appliance, an Internet-of-Things (IoT) device, a vehicle, a household appliance, or any other type of electronic device.

The computer nodes 102-1 to 102-N are part of a cluster of computer nodes. The computer nodes 102-1 to 102-N are interconnected by a network 104 to a network-attached memory, which in some examples includes a fabric attached memory (FAM) 106.

Examples of the network 104 can include an interconnect (e.g., a high throughput, low-latency interconnect) between processors and memories, which can be based on an open-source standard, a protocol defined by a standards body, or a proprietary implementation.

The FAM 106 includes one or more memory servers 108. Each memory server 108 includes a memory controller 110 that manages the access of data in a memory 112 of the memory server 108 in response to requests from a computer node. The memory 112 can include a persistent memory and/or a volatile memory. A "persistent" memory refers to a memory that can maintain data stored in the memory even if power is removed from the memory. A persistent memory can be implemented with one or more persistent memory devices, such as flash memory devices, disk-based storage devices, or other types of memory devices that are able to retain data when power is removed. A volatile memory can be implemented with one or more volatile memory devices, such as dynamic random access memory (DRAM) devices, static random access memory (SRAM) devices, or other types of memory devices that retain data while powered but lose the data when power is removed.

Each memory server 108 further includes a network interface controller (NIC) 114 to allow the memory server 108 to communicate over the network 104. The NIC 114 can include a transceiver that transmits and receives signals. Further, the NIC 114 can include one or more protocol layers that perform communications over the network 104 according to respective one or more communication protocols.

The computer node 102-1 includes a central processing unit (CPU) 116-1, a local memory 118-1, and a NIC 119-1 to communicate over the network 104. A CPU can include one or more processors. A processor can include a microprocessor, a core of a multi-core microprocessor, a microcontroller, a programmable integrated circuit, a programmable gate array, or another hardware processing circuit. A local memory can be implemented using one or more memory devices, which can be any or some combination of the following: a DRAM device, an SRAM device, a flash memory device, or another type of memory device.

The CPU 116-1 is able to execute machine-readable instructions to perform various tasks, including accessing (reading and/or writing) data in the FAM 106. The machine-readable instructions executed by the CPU 116-1 can include an application program, an operating system (OS), firmware, or other types of programs.

The computer node 102-1 further includes an incremental backup manager 120-1 that is able to initiate an incremental backup of data from the FAM 106 (or more specifically, from the memory 112 of the memory server 108) to a backup storage system 130. In the ensuing discussion, reference is made to an example in which the FAM 106 includes a single memory server 108. Techniques or mechanisms according to some implementations of the present disclosure can also be applied in a context where the FAM 106 includes multiple memory servers 108.

The computer node 102-1 further includes a page map monitor 150-1 and a page map collator 152-1. The tasks of the page map monitor 150-1 and a page map collator 152-1 are discussed further below. Although shown as separate components, some or all of the incremental backup manager 120-1, the page map monitor 150-1, and the page map collator 152-1 can be integrated into one component.

Each of the incremental backup manager 120-1, the page map monitor 150-1 and the page map collator 152-1 can be implemented using one or more hardware processing circuits, which can include any or some combination of a microprocessor, a core of a multi-core microprocessor, a microcontroller, a programmable integrated circuit, a programmable gate array, or another hardware processing circuit. Alternatively, each of the incremental backup manager 120-1, the page map monitor 150-1 and the page map collator 152-1 can be implemented with machine-readable instructions (software and/or firmware) executable on the one or more hardware processing circuits, such as the CPU 116-1.

The computer node 102-N similarly includes the CPU 116-N, a local memory 118-N, a NIC 119-N, an incremental backup manager 122-N, and a page map monitor 150-N. In some examples, the page map collator 152-1 is included in just one of the computer nodes, which in FIG. 1A is the computer node 102-1. In other examples, page map collators can be included in multiple computers. The ensuing discussion refers to operations of components of the computer node 102-1. Corresponding components of the computer node 102-N can perform similar operations.

In response to writes performed by the computer node 102-1 to the FAM 106 that modify data stored in the FAM 106, the CPU 116-1 updates a modified data tracking structure that includes indicators of modified data portions stored in the FAM 106. A "modified" data portion stored in the FAM 106 refers to a data portion in the FAM 106 that has been changed (e.g., by a write operation) relative to a copy of the data portion stored at the backup storage system 130.

In the ensuing discussion, data portions that can be tracked by the computer node 102-1 are referred to as pages. A page has a specified size (referred to as a "page size"). In such examples, the modified data tracking structure maintained by the computer node 102-1 is a page map 124-1 stored in the local memory 118-1 of the computer node 102-1. For example, the page map 124-1 may be updated by an OS or other machine-readable instructions executed by the CPU 116-1.

In the ensuing discussion, reference to a CPU performing an action can refer to an OS or other machine-readable instructions executed on the CPU performing the action.

The page map 124-1 includes entries that correspond to pages stored in the FAM 106. An "entry" can refer to any information element within a larger data structure. An entry can include a single attribute or multiple attributes. A first entry for a first map can include a modified indicator for indicating whether or not a first page is modified, a second entry for a first map can include a modified indicator for indicating whether or not a second page is modified, and so forth. The modified indicator can be in the form of a flag (implemented with a single bit or multiple bits) that is set to a first value to indicate that the respective page is modified or to a different second value to indicate that the respective page in the FAM 106 is not modified with respect to a copy of the page in the backup storage system 130.

In some examples, the entries of the page map 124-1 can identify the page numbers or other page identifiers of respective pages. In other examples, identifiers of pages can be implicitly derived from a position of the entry in the page map 124-1 (e.g., a first entry refers to a first page, a second entry refers to a second page, and so forth).

Similarly, in response to writes performed by the computer node 102-N to the FAM 106 that modify data stored in the FAM 106, the CPU 116-N (or more specifically, an OS or other machine-readable instructions executing on the CPU 116-N) updates a modified data tracking structure (e.g., a page map 124-N) in the local memory 118-N of the computer node 102-N. The page map 124-N includes modified indicators to indicate whether or not pages stored in the FAM 106 are modified with respect to copies of the pages in the backup storage system 130.

An incremental backup manager at any of the computer nodes 102-1 to 102-N can initiate an incremental data backup from the FAM 106 to the backup storage system 130 (the computer node that initiates the incremental data backup is referred to as an "initiating computer node").

Note that the page maps 124-1 to 124-N identifying modified pages are distributed across multiple computer nodes. As a result, if the initiating computer node has to obtain individual page maps from the other computer nodes and collate multiple page maps as part of the incremental data backup operation, delays and inefficient usage of resources may result in connection with the incremental data backup operation.

In accordance with some implementations of the present disclosure, to support more efficient incremental data backup operations initiated by any computer node, the page map monitors 150-1 to 150-N and the page map collator 152-1 are used to produce a combined data structure based on the content of the page maps 124-1 to 124-N, which in some examples is a combined page map 142 stored in the memory 112 of the memory server 108. The combined page map 142 includes indicators of modified pages (as modified by any or some combination of the computer nodes 102-1 to 102-N) stored in the FAM 106. The combined page map 142 is accessible by any of the plurality of computer nodes 102-1 to 102-N to initiate an incremental data backup operation that backs up modified pages from the FAM 106 to the backup storage system 130.

The combined page map 142 can be continually updated (e.g., updated on a periodic basis or in response to another event) as pages in the FAM 106 are modified. The update of the combined page map 142 can be performed as a background update process in one or more of the computer nodes 102-1 to 102-N. Such a background update process can be performed when the computer node(s) are idle or not busy. By continually updating the combined page map 142, an updated version of the combined page map 142 is available and accessible from the FAM 106 whenever an incremental backup manager in any of the computer nodes 102-1 to 102-N is ready to initiate an incremental data backup.

An incremental data backup operation copies modified pages from the FAM 106 to the backup storage system 130. The backup storage system 130 may be located at a location that is remote from the FAM 106. The backup storage system 130 includes a backup storage medium 132 to store instances of incremental backup data 134. The backup storage medium 132 can include a collection of storage devices (a single storage device or multiple storage devices).

The instances of incremental backup data 134 can represent copies of backup data produced by incremental data backups at different points in time. For example, a first instance of incremental backup data 134 can include a copy of modified pages at a first time point, a second instance of incremental backup data 134 can include a copy of modified pages at a second time point, and so forth.

The backup storage system 130 includes a backup storage controller 136 to control access (read access and write access) of the backup storage medium 132. For example, during an incremental data backup operation, the backup storage controller 136 writes copies of modified pages from the FAM 106 to the backup storage medium 132.

A computer node can also initiate a data recovery operation to recover data (in case of data loss or error in the FAM 106). In the data recovery operation, the backup storage controller 136 reads an instance of the incremental backup data 134 from the backup storage medium 132 and provides the instance of the incremental backup data 134 to the computer node that initiated the data recovery operation. The computer node can then recover data in the FAM 106 to a prior state represented by the instance of the incremental backup data 134 provided from the backup storage controller 136.

In some examples, the combined page map 142 is produced from other data structures, including process element (PE)-range data structures 126-1 to 126-N stored in respective local memories 118-1 to 118-N of the computer nodes 102-1 to 102-N, and a host modified pages data structure 144 stored in the memory 112 of the memory server 108. In other examples, the combined page map 142 can be derived in a different manner, such as without use of one or more of the PE-range data structures 126-1 to 126-N and host modified pages data structure 144.

A computer node can execute one or more process elements (PEs) on the CPU of the computer node. A PE can be a thread or a process associated with a program under execution in the computer node. The program can be an application program or another type of program, such as an OS, firmware, or another type of machine-readable instructions. Each PE is able to access data of the FAM 106. The access can include a read access to read data from the FAM 106 or a write access to write data to the FAM 106.

A PE can access a given memory region of the FAM 106. A "memory region" refers to a portion of the FAM 106. There may be multiple memory regions that are accessed by different PEs. Multiple PEs can also access the same memory region. A PE can also access multiple memory regions.

A PE can modify data in a memory region of the FAM 106 using any of various techniques. A first technique involves a direct modification from a computer node using a load-store operation. A load-store operation is performed by issuing a load-store instruction by a CPU, which results in the CPU directly writing data of the load-store instruction to the FAM 106. Note that with the load-store operation, a copy of the data does not have to be first stored in a local memory (e.g., 118-1 to 118-N) of a computer node before copying the data from the local memory to the FAM 106.

A second technique of modifying data in the memory region of the FAM 106 uses copy semantics, such as memcopy( ) or fam_copy( ) Memcopy( ) copies data from a source (e.g., a local memory of a computer node) to a destination (e.g., the FAM 106). Fam_cpy( ) copies data from one region of the FAM 106 to another region of the FAM 106.

A third technique uses an atomic write operation. A PE that initiated an atomic write operation can set a blocking element (e.g., a lock or semaphore) with respect to an area of the FAM 106 that is being modified, so that another PE cannot access the area being modified until the write is complete.

The page maps 124-1 to 124-N can track data modifications performed using any of these techniques. A page map (e.g., any of 124-1 to 124-N) is associated with a respective PE. If there are multiple PEs executing in a computer node, then there may be multiple page maps created for the corresponding multiple PEs.

Figure 1B:
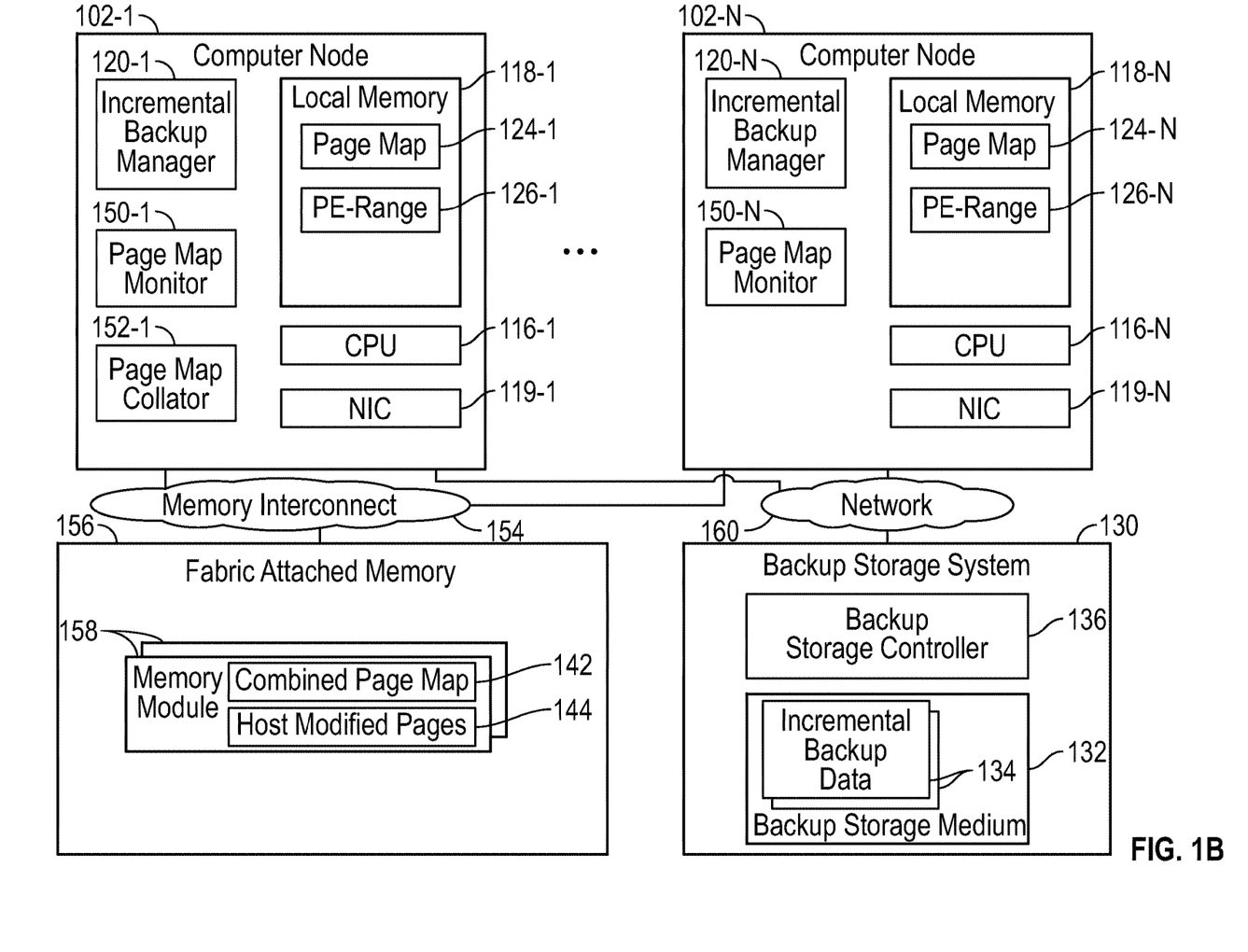
FIG. 1B is a block diagram of an arrangement that includes a FAM and computer nodes that are able to access the FAM over a memory interconnect, and a backup storage system to which an incremental data backup can be performed, in accordance with further examples.

FIG. 1B is a block diagram of a different example arrangement that includes multiple computer nodes 102-1 to 102-N (N≥2). Components in FIG. 1B that are similar to corresponding components in FIG. 1A are assigned the same reference numerals. The computer nodes 102-1 to 102-N are interconnected by a memory interconnect 154 to a FAM 156.

In an example, the memory interconnect 154 includes a CXL interconnect. CXL allows CPUs 116-1 to 116-N in the computer nodes 102-1 to 102-N to access the FAM 106. According to CXL, the memory interconnect 154 can be a direct link between the CPUs and the FAM 156, or alternatively, the memory interconnect 154 can include one or more CXL switches between the CPUs and the FAM 156.

The FAM 156 includes one or more memory modules 158. A "memory module" can refer to an individual memory device, or alternatively, to a collection of memory devices, such as a dual inline memory module (DIMM) or another type of memory module. Collectively, the one or more memory modules 158 form a memory pool that can be shared by the CPUs 116-1 to 116-N. The memory module 158 can include a persistent memory and/or a volatile memory.

The incremental backup manager 120-1 in the computer node 102-1 is able to initiate an incremental backup of data from the FAM 156 to the backup storage system 130. In an incremental backup operation, data is retrieved from the one or more memory modules 158 over the memory interconnect 154 and written by the incremental backup manager 120-1 over a network 160 to the backup storage system 130. In the ensuing discussion, reference is made to an example in which the FAM 156 includes a single memory module 158. Techniques or mechanisms according to some implementations of the present disclosure can also be applied in a context where the FAM 156 includes multiple memory modules 158.

In accordance with examples according to FIG. 1B, to support more efficient incremental data backup operations initiated by any computer node, the page map monitors 150-1 to 150-N and the page map collator 152-1 are used produce a combined data structure based on the content of the page maps 124-1 to 124-N, which in some examples is the combined page map 142 stored in the memory module 158 of the FAM 156. Note that if multiple memory modules 158 are present, the combined page map 142 may be stored on one of the memory modules 158 or across the multiple memory modules 158. The combined page map 142 includes indicators of modified pages (as modified by any or some combination of the computer nodes 102-1 to 102-N) stored in the FAM 156. The combined page map 142 is accessible by any of the plurality of computer nodes 102-1 to 102-N to initiate an incremental data backup operation that backs up modified pages from the FAM 156 to the backup storage system 130.

In some examples, the combined page map 142 is produced from other data structures, including the PE-range data structures 126-1 to 126-N stored in respective local memories 118-1 to 118-N of the computer nodes 102-1 to 102-N, and the host modified pages data structure 144 stored in the memory module 112 of the FAM 156. Note that if multiple memory modules 158 are present, the host modified pages data structure 144 may be stored on one of the memory modules 158 or across the multiple memory modules 158.

Figure 2:
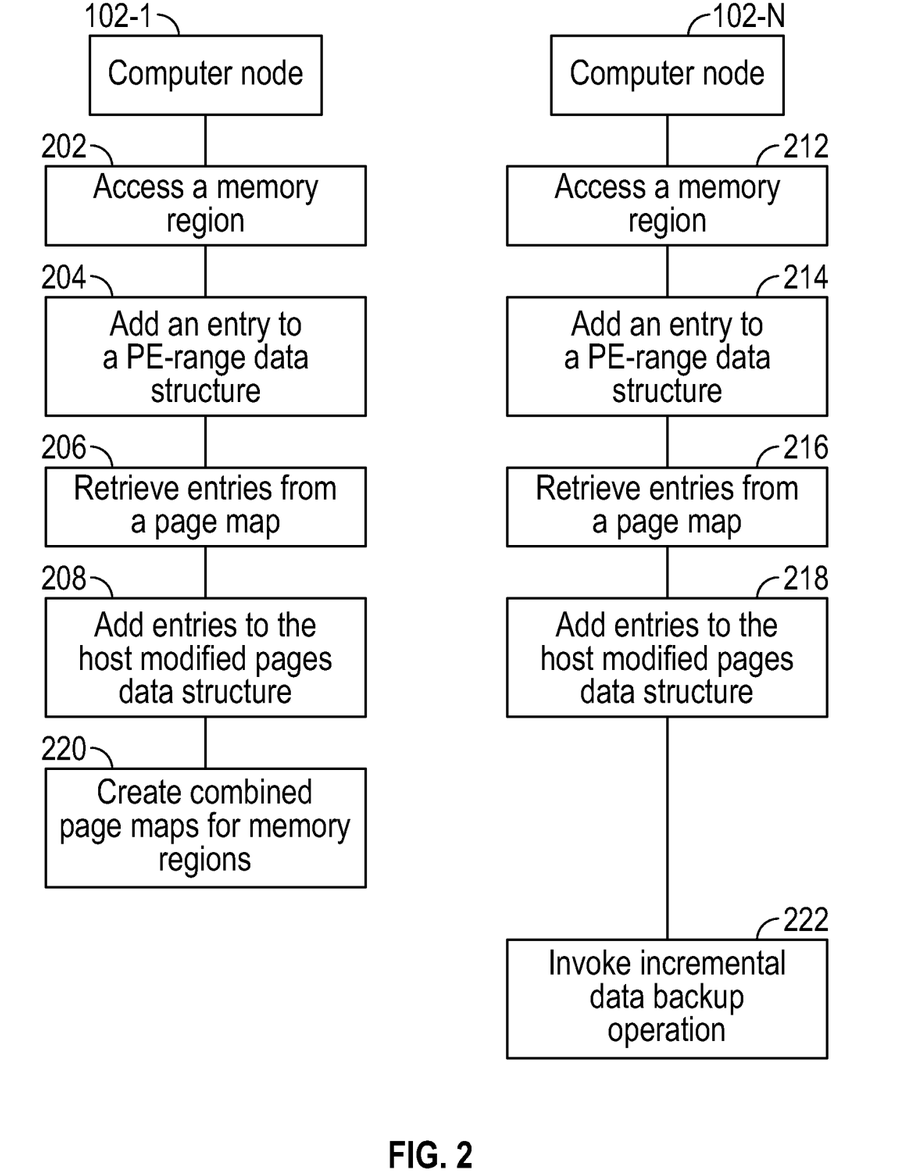
FIG. 2 is a flow diagram of a process to perform incremental data backup from a FAM to a backup storage system, according to some examples.

FIG. 2 is a flow diagram of a process according to some examples of the present disclosure. When a PE in the computer node 102-1 of FIG. 1A or 1B accesses (at 202) a memory region in the FAM 106 or 156 for the first time, the CPU 116-1 adds (at 204) an entry to a PE-range data structure 126-1 stored in the local memory 118-1 of the computer node 102-1. The PE-range data structure 126-1 includes information of each memory region of the FAM 106 or 156 that has been accessed by the PE in the computer node 102-1. In some examples, one PE-range data structure 126-1 is maintained per computer node, and this PE-range data structure 126-1 includes entries for all of the PEs in the computer node 102-1.

An example entry of the PE-range data structure 126-1 is depicted in Table 1 below.

TABLE 1

| PE ID | Memory Region ID | Starting Virtual Address | Memory Region Size | Offset |
|---|---|---|---|---|

The entry includes the following attributes: a PE ID (which identifies a PE that is accessing a memory region), a memory region ID (that identifies the memory region accessed by the PE), a starting virtual address of the memory region, a size of the memory region, and an offset of the memory region. The offset is a host physical address of the memory region in the FAM 106 or 156 as presented to a host, which can be a PE. The offset is relative to a starting physical address of the memory region in the FAM 106 or 156.

As more PEs in the computer node 102-1 access memory regions of the FAM 106, corresponding entries are added to the PE-range data structure 126-1 to provide information of the memory regions accessed by the PEs.

In a specific example, a PE initially accesses a memory region of the FAM 106 or 156 by issuing a map command that allocates a memory region of the FAM 106 or 156 to a virtual address space of the PE. In some examples, the map command is part of a FAM programming interface, which can include an application programming interface (API) that includes functions that are useable by computer nodes (or more specifically, by PEs in computer nodes) to manage a FAM and to access data of the FAM. An example of such an API is an OpenFAM API.

In an example, a map command according to the OpenFAM API can have the form: fam_map (Fam_Descriptor*descriptor), where Fam_Descriptor*descriptor looks up information of a memory region in the FAM 106 and allocates the memory region to the virtual address of the PE that called the fam_map command. The information of the memory region can include a memory region ID of the memory region, a size of the memory region, and the offset (host physical address) of the memory region.

In other examples, other types of commands can be used by a PE to access a memory region of the FAM 106 or 156.

In an example, a PE with PE ID 1049 issues the following fam_map calls:

Address1=fam_map(21,32728,40960), and

Address2=fam_map(22,65536,81920).

Address1 and Address2 are virtual addresses returned by the respective fam_map calls in the virtual address space of the PE. In the example, it is assumed that Address1=16384, and Address2=20480.

Based on the foregoing, the CPU 116-1 adds the following entries represented by Table 2 below to the PE-range data structure 126-1.

TABLE 2

| PE ID | Memory Region ID | Starting Virtual Address | Memory Region Size | Offset |
|---|---|---|---|---|
| 1049 | 21 | 16384 | 40960 | 32728 |
| 1049 | 22 | 20480 | 81920 | 65536 |

In some examples, the page map monitor 150-1 retrieves each entry of the PE-range data structure 126-1 and converts the starting virtual address of the entry to a page number as follows:

Page_Number=Starting Virtual Address/Page Size, where Page Size represents a specified size of a page (e.g., 8 bytes or a different size).

For each entry of the PE-range data structure 126-1, the page map monitor 150-1 further calculates a number of pages in each memory region as follows:

Number_of_Pages=Memory Region Size/Page Size.

In some examples, the page map monitor 150-1 uses the calculated page number (Page_Number) as an index to the page map 124-1 for the corresponding page entry (Index=Page Size*Page_Number).

More generally, the page map monitor 150-1 uses the content of PE-range data structure 126-1 to derive an index used to retrieve (at 206) a corresponding entry from the page map 124-1. The page map monitor 150-1 can periodically access the page map 124-1 to identify modified pages. In other examples, the page map monitor 150-1 can access the page map 124-1 to identify modified pages in response to other events, such as an explicit request or an indication that data has been modified.

For example, the page map 124-1 can have entries as in Table 3 below:

TABLE 3

| Information | Modified |
|---|---|
| ... | 1 |
| ... | 0 |
| ... | ... |

As noted above, the page map 124-1 has multiple entries, and each entry includes a modified indicator and other information. In the example above, the modified indicator in the first entry is set to 1 (to indicate that a first page represented by the first entry is modified), and the modified indicator in the second entry is set to 0 (to indicate that a second page represented by the second entry is not modified). The calculated index (Index=Page Size*Page_Number) refers to one of the entries of the page map 124-1. The page map monitor 150-1 retrieves the modified indicator from the indexed entry, which indicates whether or not the associated page (identified by Page_Number) is modified. The page map monitor 150-1 calculates indexes for the remaining pages of the memory region to retrieve (at 206) the modified indicators for the remaining pages (note that the number of pages in the memory region is represented by Number_of_Pages).

For each entry of the page map 124-1 in which the modified indicator is set to 1 (indicating that the associated page is modified), the page map monitor 150-1 adds (at 208) an entry to the host modified pages data structure 144. In some examples, each entry of the host modified pages data structure 144 can have the elements shown in Table 4 below.

TABLE 4

| Computer Node ID | Memory Region ID | Offset | Modified Page Number |
|---|---|---|---|

The computer node ID identifies a computer node, the memory region ID identifies a memory region, the Offset is the offset of the memory region as reflected in the PE-range data structure 126-1, and the modified page number identifies a page that has been modified.

Tasks 212, 214, 216, and 218 in the computer node 102-N are similar to the corresponding tasks 202, 204, 206, and 208 in the computer node 102-1. When a PE in the computer node 102-N accesses (at 212) a memory region in the FAM 106 for the first time, the CPU 116-N adds (at 214) an entry to a PE-range data structure 126-N stored in the local memory 118-N of the computer node 102-N.

The page map monitor 150-N uses the content of PE-range data structure 126-N to derive indexes used to retrieve (at 216) corresponding entries from the page map 124-N.

For each entry of the page map 124-N in which the modified indicator is set to 1 (indicating that the associated page is modified), the page map monitor 150-N adds (at 218) an entry to the host modified pages data structure 144.

Assuming an example in which a PE in a computer node with ID 1 modified page number 5 in memory region 21 and modified page number 7 in memory region 22, and a PE in a computer node with ID 3 modified page number 5 in memory region 21, the entries in Table 5 below are added to the host modified pages data structure 144.

TABLE 5

| Computer Node ID | Memory Region ID | Offset | Modified Page Number |
|---|---|---|---|
| 1 | 21 | 32768 | 5 |
| 1 | 22 | 65536 | 7 |
| 3 | 21 | 32768 | 5 |

Note in the above example that computer nodes 1 and 3 have both modified the same page (page number 5) in the same memory region, as reflected by entries 1 and 3 in Table 5 above.

More generally, the page map monitor 150-1 tracks the page map 124-1 for each PE to find pages that have been modified, and adds entries representing the modified pages to the host modified pages data structure 144 in the memory 112 of the memory server 108 of FIG. 1A or in the memory module 158 of the FAM 156 of FIG. 1B.

It is possible for an incremental backup manager (e.g., any of 120-1 to 120-N) to use the host modified pages data structure 144 for initiating an incremental data backup. However, for improved efficiency, the content of the host modified pages data structure 144 can be integrated by the page map collator 152-1 into the combined page map 142 for more efficient usage by an incremental backup manager. For example, the page map collator 152-1 creates (at 220) different combined page maps for respective different memory regions based on the host modified pages data structure 144. In the example above where there are two memory regions with IDs 21 and 22, two different combined page maps are created. Also, multiple entries in the host modified pages data structure 144 corresponding to the same modified page number in the same memory region (e.g., entries 1 and 3 in Table 5 above) are combined so that the combined page map 142 has just one entry per page number. Also, in some examples, the combined page map 142 can be in the form of a bitmap for faster access by an incremental backup manager. The combined page map 142 is accessible by any of the incremental backup managers 120-1 to 120-N in the respective computer nodes 102-1 to 102-N.

Although FIG. 2 assumes an example in which a page map collator in the computer node 102-1 derives the combined page maps. In other examples, a page map collator in a different computer node can derive the combined page maps. In yet further examples, page map collators in multiple computer nodes can derive combined page maps based on the host modified pages data structure 144.

An example of the combined page map 142 is depicted in Table 6 below.

TABLE 6

| 1 | 1 | 0 | 1 | ... | 0 |
|---|---|---|---|-----|---|

The combined page map 142 of Table 6 is a bitmap including an array of bits. The array of bits can be a one-dimensional array or a multi-dimensional array. Each bit represents a respective different page of a given memory region. The combined page map 142 is associated with a corresponding memory region. Each bit of the combined page map 142 can have a first value (e.g., "1") to indicate that the corresponding page has been modified, and a second value (e.g., "0") to indicate that the corresponding page has not been modified.

When an incremental backup manager (e.g., in the computer node 102-N) invokes (at 222) an incremental data backup operation, the incremental backup manager accesses the combined page map 142 to identify modified pages. The incremental backup manager then performs an incremental data backup of the modified pages to the backup storage system 130. Once the incremental data backup operation is completed, the combined page map 142 is reset (such as to all 0s). Note that the content of the host modified pages data structure 144 for the backed up memory region is also reset, such as by removing all entries of the host modified pages data structure 144 corresponding to the backed up memory region. Each computer node is also informed that the incremental data backup operation is completed, so the corresponding CPU (or more specifically, machine-readable instructions executed on the CPU) can reset the corresponding page map for the memory region that has been backed up.

Figure 3:
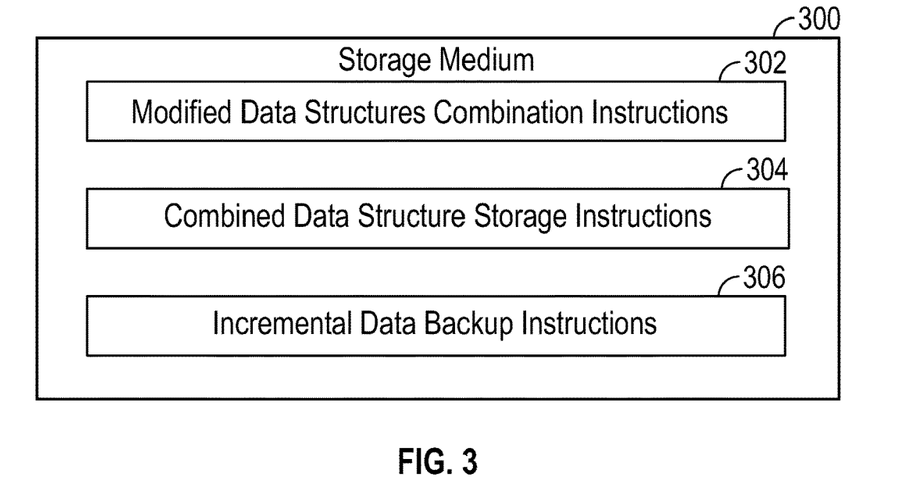
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include a computer node or multiple computer nodes.

The machine-readable instructions include modified data tracking structures combination instructions 302 to combine modified data tracking structures in a plurality of computer nodes into a combined tracking data structure. Each modified data tracking structure includes indicators of modified data portions in a network-attached memory. In some examples, the modified data tracking structures include page maps 124-1 to 124-N of FIG. 1A or 1B, and the combined tracking data structure includes the combined page map 142 of FIG. 1A or 1B.

The machine-readable instructions include combined tracking data structure storage instructions 304 to store the combined tracking data structure at the network-attached memory. The combined tracking data structure comprises indicators of modified data portions as modified by multiple computer nodes of the plurality of computer nodes. For example, the combined page map 142 is stored at the FAM 106 in FIG. 1A or 1B.

The machine-readable instructions include incremental data backup instructions 306 to, as part of an incremental data backup operation, use the combined tracking data structure to provide the modified data portions from the network-attached memory to a backup storage system. The incremental data backup operation backs up modified data portions to the backup storage system without backing up unmodified data portions in the network-attached memory.

In some examples, the machine-readable instructions access the modified data tracking structures to identify a plurality of modified data portions, add entries corresponding to the plurality of modified data portions to a memory-side tracking structure stored at the network-attached memory, and create the combined tracking data structure based on the memory-side tracking structure. An example of the memory-side tracking structure is the host modified pages data structure 144 of FIG. 1A or 1B.

In some examples, the entries of the memory-side tracking structure identify data portions modified by multiple computer nodes of the plurality of computer nodes.

In some examples, an entry of the memory-side tracking structure includes a computer node identifier to identify a computer node that modified a data portion, a memory region identifier of a memory region in which the data portion is included, and an identifier of the data portion (e.g., a page number) in the memory region.

In some examples, responsive to an access of a memory region by a PE in a first computer node, the machine-readable instructions create an entry in a PE-range data structure, the entry in the PE-range data structure including an identifier of the memory region and a virtual address of the memory region.

In some examples, the machine-readable instructions derive an identifier of a first data portion based on the virtual address and a size of the data portion, use the identifier to retrieve a corresponding entry of a modified data tracking structure in the first computer node, and determine based on the corresponding entry of the modified data tracking structure whether the first data portion is modified.

In some examples, responsive to determining that the first data portion is modified, the machine-readable instructions add a respective entry corresponding to the first data portion to the memory-side tracking structure.

In some examples, the combined tracking data structure is associated with a memory region in the network-attached memory and is separate from another combined tracking data structure associated with another memory region in the network-attached memory.

In some examples, the combined tracking data structure includes a tracking bitmap, and the indicators include bits of the tracking bitmap set to a first value indicating that respective data portions in the network-attached memory are modified with respect to corresponding data portions in the backup storage system. Other bits of the tracking bitmap set to a different second value indicate that respective further data portions in the network-attached memory are unmodified with respect to corresponding data portions in the backup storage system.

In some examples, a data portion in the network-attached memory is writable directly by a processor in a computer node of the plurality of computer nodes. For example, the data portion in the network-attached memory is writable in response to a load-store instruction of the processor.

Figure 4:
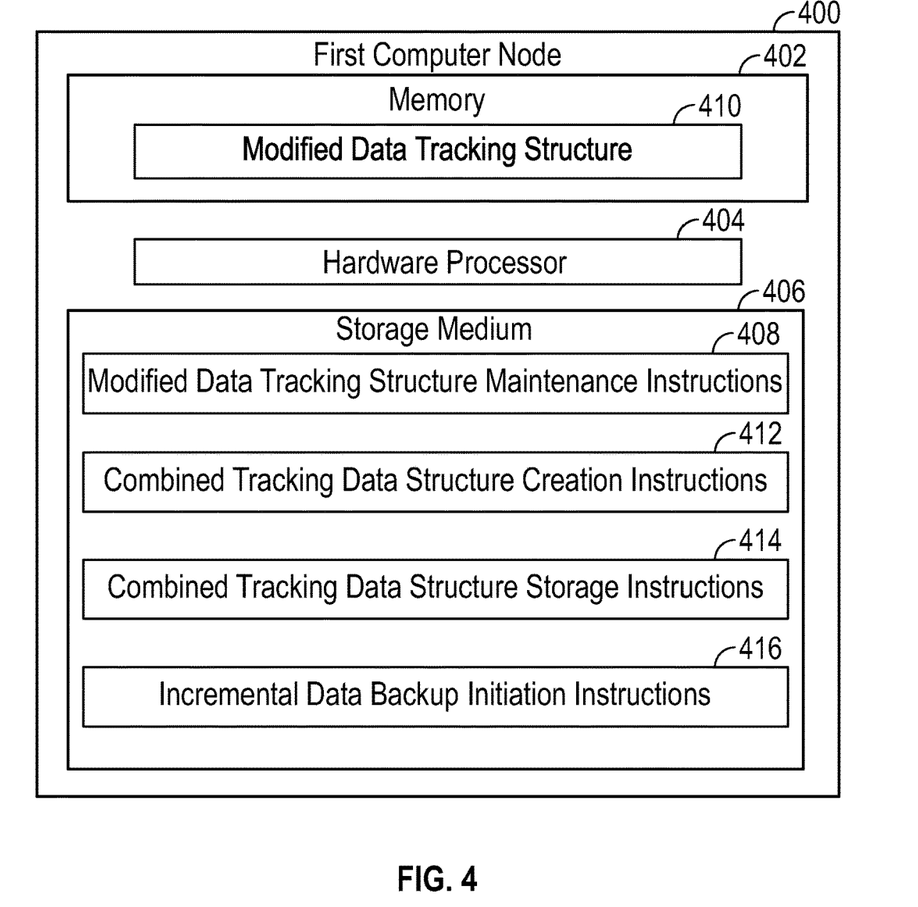
FIG. 4 is a block diagram of a computer node according to some examples.

FIG. 4 is a block diagram of a first computer node 400, which can be any of the computer nodes 102-1 to 102-N of FIG. 1A or 1B, for example. The first computer node 400 includes a memory 402 and a hardware processor 404 (or multiple hardware processors).

The first computer node 400 includes a storage medium 406 storing machine-readable instructions executable on the hardware processor 404 to perform various tasks. Machine-readable instructions executable on a hardware processor can refer to the machine-readable instructions executable on a single hardware processor or the instructions executable on multiple hardware processors.

The machine-readable instructions in the storage medium 406 include modified data tracking structure maintenance instructions 408 to maintain a first modified data tracking structure 410 in the memory 402 of the first computer node 400. The first modified data tracking structure 410 includes indicators of modified data portions in a network-attached memory as modified by the first computer node 400.

The machine-readable instructions in the storage medium 406 include combined tracking data structure creation instructions 412 to create a combined tracking data structure based on the first modified data tracking structure and a second modified data tracking structure maintained at a second computer node. The second modified data tracking structure including indicators of modified data portions in the network-attached memory as modified by the second computer node.

The machine-readable instructions in the storage medium 406 include combined tracking data structure storage instructions 414 to store the combined tracking data structure in the network-attached memory. The combined tracking data structure stored in the network-attached memory is accessible by any of multiple computer nodes.

The machine-readable instructions in the storage medium 406 include incremental data backup initiation instructions 416 to initiate of an incremental data backup operation using the combined tracking data structure to copy modified data portions from the network-attached memory to a backup storage system.

Figure 5:
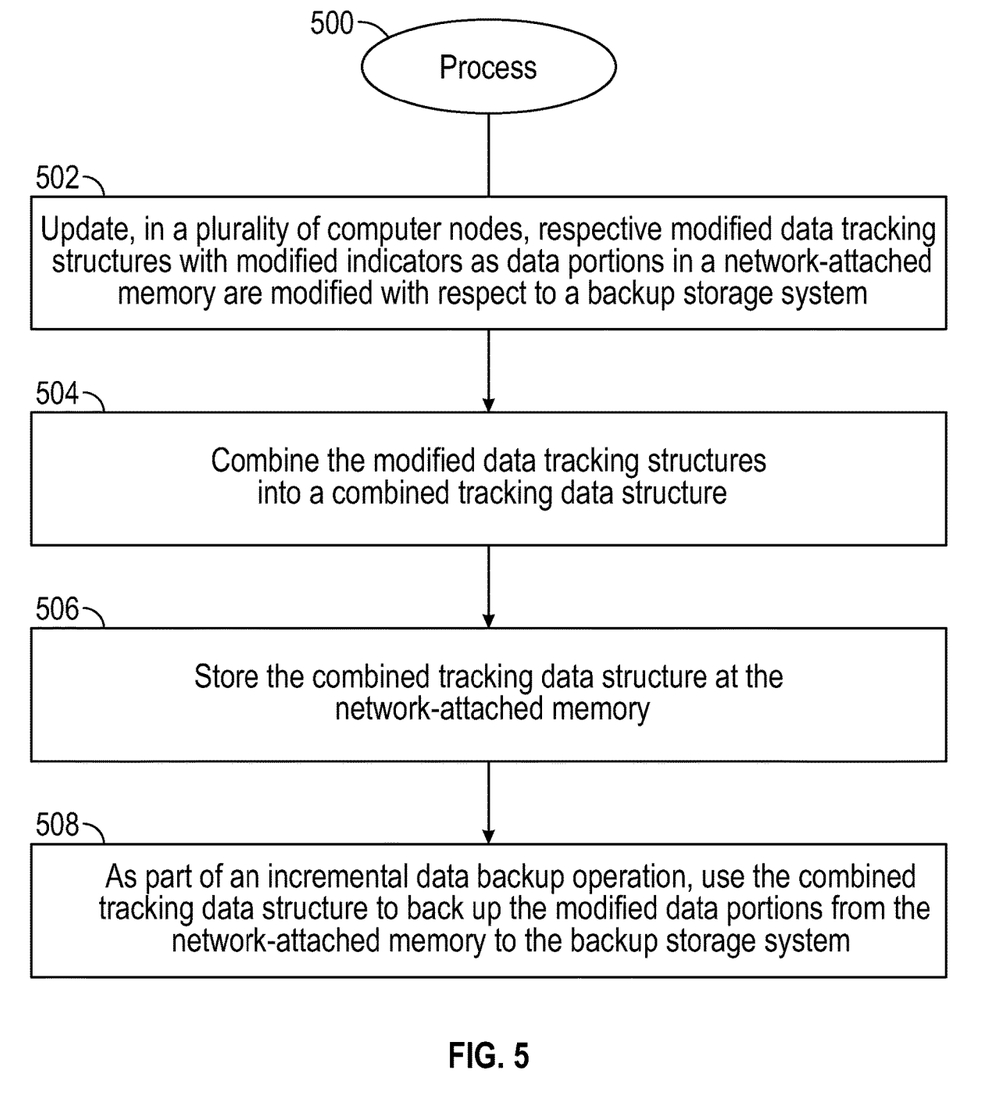
FIG. 5 is a flow diagram of a process according to some examples.

FIG. 5 is a flow diagram of a process 500 according to some examples. The process 500 can be performed by one or more computer nodes, such as 102-1 to 102-N in FIG. 1A or 1B.

The process 500 includes updating (at 502), in a plurality of computer nodes, respective modified data tracking structures (e.g., page maps 124-1 to 124-N) with modified indicators as data portions in a network-attached memory are modified with respect to a backup storage system.

The process 500 includes combining (at 504) the modified data tracking structures into a combined tracking data structure (e.g., the combined page map 142 of FIG. 1A or 1B). Note that combining the modified data tracking structures into a combined tracking data structure can involve use of other data structures, such as the PE-range data structures 126-1 to 126-N and the host modified pages data structure 144 of FIG. 1A or 1B.

The process 500 includes storing (at 506) the combined tracking data structure at the network-attached memory. The combined tracking data structure at the network-attached memory is accessible by any of the plurality of computer nodes to initiate an incremental data backup operation.

As part of the incremental data backup operation, the process 500 includes using (at 508) the combined tracking data structure to back up the modified data portions from the network-attached memory to the backup storage system.

A storage medium (e.g., 300 in FIG. 3) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a first computer node to:

maintain a first modified data tracking structure in a memory of the first computer node, wherein the first modified data tracking structure comprises indicators of modified data portions in a network-attached memory as modified by the first computer node;

responsive to an access of a memory region in the network-attached memory, add an entry to a data structure, the added entry identifying the memory region and including a virtual address for the memory region;

derive an index from the virtual address in the data structure, the index referring to a respective entry of the first modified data tracking structure for a data portion;

retrieve the respective entry from the first modified data tracking structure using the index, and determine whether the data portion is modified based on the respective entry;

create a combined tracking data structure based on entries in the first modified data tracking structure indicating modified data portions and based on a second modified data tracking structure maintained at a second computer node, wherein the second modified data tracking structure comprises indicators of modified data portions in the network-attached memory as modified by the second computer node;

store the combined tracking data structure at the network-attached memory; and initiate an incremental data backup operation using the combined tracking data structure to copy modified data portions from the network-attached memory to a backup storage system.

2. The non-transitory machine-readable storage medium of claim 1, wherein the combined tracking data structure comprises indicators of modified data portions as modified by a plurality of computer nodes including the first and second computer nodes.

3. The non-transitory machine-readable storage medium of claim 2, wherein the instructions upon execution cause the first computer node to:

access the first and second modified data tracking structures to identify a plurality of modified data portions;

add entries corresponding to the plurality of modified data portions to a memory-side tracking structure stored at the network-attached memory; and create the combined tracking data structure based on the memory-side tracking structure.

4. The non-transitory machine-readable storage medium of claim 3, wherein the entries of the memory-side tracking structure identify data portions modified by the plurality of computer nodes.

5. The non-transitory machine-readable storage medium of claim 4, wherein an entry of the memory-side tracking structure includes a computer node identifier to identify a computer node that modified a respective data portion, a memory region identifier of a corresponding memory region in which the respective data portion is included, and an identifier of the respective data portion in the corresponding memory region.

6. The non-transitory machine-readable storage medium of claim 3, wherein the data structure is a process element (PE)-range data structure, and the entry is added to the PE-range data structure responsive to the access of the memory region in the network-attached memory by a PE.

7. The non-transitory machine-readable storage medium of claim 3, wherein the index is based on the virtual address and a size of the data portion.

8. The non-transitory machine-readable storage medium of claim 7, wherein the instructions upon execution cause the first computer node to:

responsive to determining that the first data portion is modified, add a respective entry corresponding to the first data portion to the memory-side tracking structure.

9. The non-transitory machine-readable storage medium of claim 3, wherein the combined tracking data structure is associated with the memory region in the network-attached memory and is separate from another combined tracking data structure associated with another memory region in the network-attached memory.

10. The non-transitory machine-readable storage medium of claim 2, wherein the combined tracking data structure comprises a tracking bitmap, and the indicators of the combined tracking data structure comprise bits of the tracking bitmap set to a first value indicating that respective data portions in the network-attached memory are modified with respect to corresponding data portions in the backup storage system, and wherein other bits of the tracking bitmap set to a different second value indicate that respective further data portions in the network-attached memory are unmodified with respect to corresponding data portions in the backup storage system.

11. The non-transitory machine-readable storage medium of claim 1, wherein the combined tracking data structure stored at the network-attached memory is accessible over a network or a memory interconnect by any of a plurality of computer nodes including the first and second computer nodes.

12. The non-transitory machine-readable storage medium of claim 1, wherein a given data portion in the network-attached memory is writable directly by a processor in the first computer node.

13. The non-transitory machine-readable storage medium of claim 12, wherein the given data portion in the network-attached memory is writable in response to a load-store instruction of the processor.

14. A first computer node comprising:

a memory;

a hardware processor; and a non-transitory storage medium comprising instructions executable on the hardware processor to:

maintain a first modified data tracking structure in the memory of the first computer node, wherein the first modified data tracking structure comprises indicators of modified data portions in a network-attached memory as modified by the first computer node;

responsive to an access of a memory region in the network-attached memory, add an entry to a data structure, the added entry identifying the memory region and including a virtual address for the memory region and a physical address of the memory region at the network-attached memory;

derive an index from the virtual address in the data structure, the index referring to a respective entry of the first modified data tracking structure for a data portion;

retrieve the respective entry from the first modified data tracking structure using the index, and determine whether the data portion is modified based on the respective entry;

create a combined tracking data structure based on entries in the first modified data tracking structure indicating modified data portions and based on a second modified data tracking structure maintained at a second computer node, the second modified data tracking structure comprising indicators of modified data portions in the network-attached memory as modified by the second computer node;

store the combined tracking data structure at the network-attached memory; and initiate an incremental data backup operation using the combined tracking data structure to copy modified data portions from the network-attached memory to a backup storage system.

15. The first computer node of claim 14, wherein the combined tracking data structure stored at the network-attached memory is accessible over a network or a memory interconnect by any of a plurality of computer nodes.

16. The first computer node of claim 14, wherein the instructions are executable on the hardware processor to:

access the first and second modified data tracking structures to identify a plurality of modified data portions;

add entries corresponding to the plurality of modified data portions to a memory-side tracking structure stored at the network-attached memory; and create the combined tracking data structure based on the memory-side tracking structure.

17. The first computer node of claim 16, wherein an entry of the memory-side tracking structure includes a computer node identifier to identify a computer node that modified a respective data portion, a memory region identifier of a corresponding memory region in which the respective data portion is included, and an identifier of the respective data portion in the corresponding memory region.

18. The first computer node of claim 14, wherein the index is based on the virtual address and a size of the data portion.

19. A method of a first computer node comprising a hardware processor, comprising:

maintaining a first modified data tracking structure in a memory of the first computer node, wherein the first modified data tracking structure comprises indicators of modified data portions in a network-attached memory as modified by the first computer node;

as a response to an access of a memory region in the network-attached memory, adding an entry to a data structure, the added entry identifying the memory region and including a virtual address for the memory region;

deriving an index from the virtual address in the data structure, the index referring to a respective entry of the first modified data tracking structure for a data portion;

retrieving the respective entry from the first modified data tracking structure using the index, and determining whether the data portion is modified based on the respective entry;

creating a combined tracking data structure based on entries in the first modified data tracking structure indicating modified data portions and based on a second modified data tracking structure maintained at a second computer node, the second modified data tracking structure comprising indicators of modified data portions in the network-attached memory as modified by the second computer node;

storing the combined tracking data structure at the network-attached memory; and initiating an incremental data backup operation using the combined tracking data structure to copy modified data portions from the network-attached memory to a backup storage system.

20. The method of claim 19, further comprising:

adding entries to a memory-side data structure for data portions determined to be modified based on modified data tracking structures in a plurality of computer nodes including the first and second computer nodes; and creating the combined tracking data structure using the entries in the memory-side data structure.

\* \* \* \* \*